(12) United States Patent
Hsieh

(10) Patent No.: US 8,253,270 B2
(45) Date of Patent: Aug. 28, 2012

(54) AUTOMOBILE LIGHT CONTROL SYSTEM

(75) Inventor: Ming-Chih Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 257 days.

(21) Appl. No.: 12/860,942

(22) Filed: Aug. 23, 2010

(65) Prior Publication Data

US 2012/0032593 A1 Feb. 9, 2012

(51) Int. Cl.
*B60L 1/14* (2006.01)
(52) U.S. Cl. ............................................ 307/10.8; 315/79
(58) Field of Classification Search ................ 307/10.8; 315/77, 79, 82; 362/464, 465, 466
See application file for complete search history.

(56) References Cited

U.S. PATENT DOCUMENTS 5,473,306 A * 12/1995 Adell ............................ 340/468

* cited by examiner

*Primary Examiner* — Daniel Cavallari
(74) *Attorney, Agent, or Firm* — Altis Law Group, Inc.

(57) ABSTRACT

An automobile light control system includes first and second light groups, a battery, a micro control unit (MCU), a speed sensor, first and second switches, and an electronic switch. The battery is connected to the first light group through the first switch. The first light group is connected to the first terminal of the electronic switch through the second switch. The second terminal of the electronic switch is connected to the second light group. The control terminal of the electronic switch is connected to the MCU. The MCU is connected to the speed sensor to receive a speed signal. The MCU controls the electronic switch to be turned on in response to the speed signal being greater than a predetermined value. The MCU controls the electronic switch to be turned off in response to the speed signal being less than or equal to the predetermined value.

4 Claims, 1 Drawing Sheet

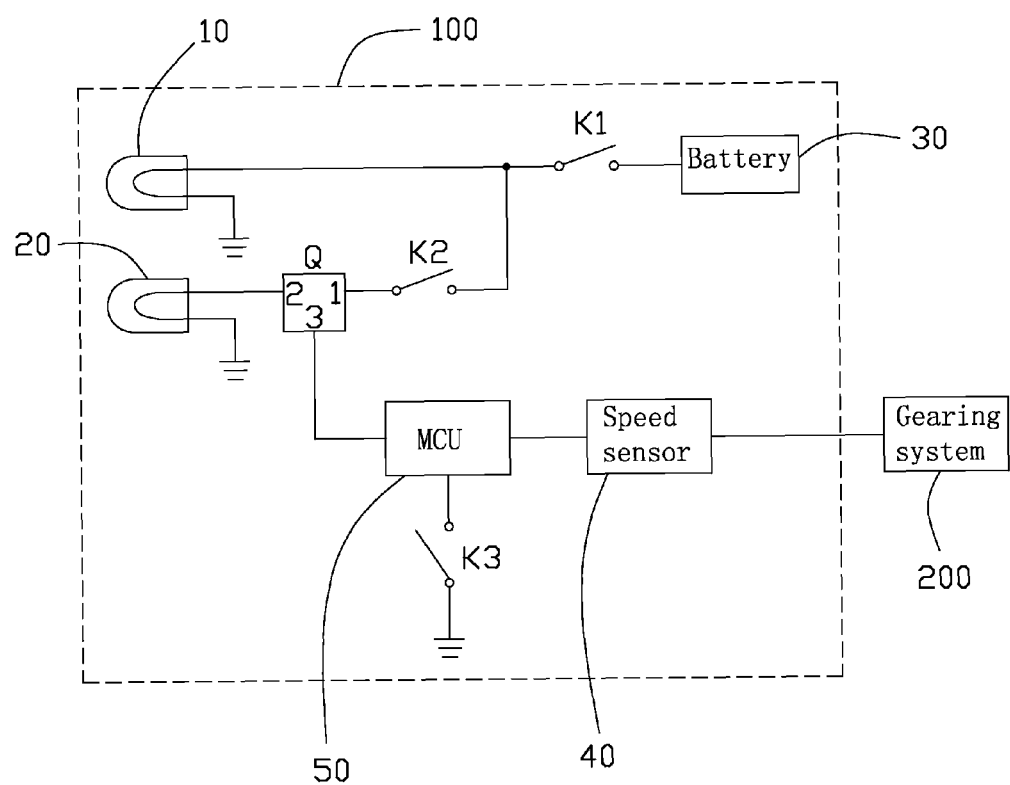

AUTOMOBILE LIGHT CONTROL SYSTEM

BACKGROUND

1. Technical Field

The present disclosure relates to an automobile light control system.

2. Description of Related Art

There are generally two kinds of lights installed in automobiles. A first kind of the lights need to be turned on all the time, and a second kind of the lights need to be turned on as needed when the automobile is moving to light up the road ahead. The first kind of lights can be daytime running lights. The second kind of lights can be low beam lights. However, when a driver just wants to stop the automobile for a short time, such as during a red traffic signal, he/she may forget to turn off the low beam headlights, which may waste fuel in order to recharge the battery. Therefore, there is room for improvement in the art.

BRIEF DESCRIPTION OF THE DRAWING

Many aspects of the present embodiments can be better understood with reference to the following drawing. The components in the drawing are not necessarily drawn to scale, the emphasis instead being placed upon clearly illustrating the principles of the present embodiments. Moreover, in the drawing, all the views are schematic, and like reference numerals designate corresponding parts throughout the several views.

The FIGURE is a circuit diagram of an embodiment of an automobile light control system.

DETAILED DESCRIPTION

The disclosure, including the accompanying drawing, is illustrated by way of example and not by way of limitation. It should be noted that references to "an" or "one" embodiment in this disclosure are not necessarily to the same embodiment, and such references mean at least one.

Referring to the FIGURE, an embodiment of an automobile light control system 100 used in an automobile includes a daytime running light group 10, a low beam light group 20, a battery 30, a speed sensor 40, a micro control unit (MCU) 50, a first switch K1, a second switch K2, a third switch K3, and an electronic switch Q. The daytime running light group 10 may include a plurality of lights. The low beam light group 20 may include a plurality of headlights used to light road when the automobile is moving.

The battery 30 is connected to a power terminal of the daytime running light group 10 through the first switch K1. A ground terminal of the daytime running light group 10 is grounded. A node between the daytime running light group 10 and the first switch K1 is connected to a first terminal 1 of the electronic switch Q through the second switch K2. A second terminal 2 of the electronic switch Q is connected to a power terminal of the low beam light group 20. A ground terminal of the low beam light group 20 is grounded. A control terminal 3 of the electronic switch Q is connected to the MCU 50. The third switch K3 is connected between the MCU 50 and ground. The MCU 50 is also connected to the speed sensor 40. The MCU 50 is used to output a control signal to the control terminal 3 of the electronic switch Q to switch the connection relationship between the first terminal 1 and the second terminal 2 of the electronic switch Q, namely to turn on or off the electronic switch Q. The third switch K3 is used to control the MCU 50 to control the electronic switch Q to be turned on all the time when the third switch K3 is turned on. The electronic switch Q may be a relay or a transistor or other kinds of electronic switches. The first to third switches K1-K3 are located on appropriated positions in the automobile, where the driver can easily operate the first to third switches K1-K3.

The speed sensor 40 is also connected to a gearing system 200 of the automobile, to sense the speed of the automobile and correspondingly send a speed signal to the MCU 40. The MCU 40 receives the speed signal and compares the speed signal with a predetermined value. If the speed signal is greater than the predetermined value, the MCU 40 controls the electronic switch Q to be turned on. If the speed signal is less than or equal to the predetermined value, the MCU 40 controls the electronic switch Q to be turned off. Namely, when the speed of the automobile is greater than a predetermined value, such as 0 miles/hour (MPH), the electronic switch Q is turned on.

In use, for example at night, before the automobile is moved, the first switch K1 is turned on, therefore the daytime running light group 10 is turned on to indicate to pedestrians or other automobile operators where the automobile is. When the automobile is moved, the first switch K1 is turned on, because the speed of the automobile is greater than 0 MPH, the low beam light group 20 is turned on to light road which can help the driver to drive the automobile. When the automobile stops for a short time, such as waiting for a traffic signal, the speed of the automobile is 0 MPH, therefore the low beam light group 20 is turned off, which can save fuel. If the driver wants to turn on the low beam light group 20 all the time, he/she can turn on the third switch K3 to bypass the saving fuel function.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. An automobile light control system, comprising:
   a first light group comprising a power terminal and a grounded ground terminal;
   a second light group comprising a power terminal and a grounded ground terminal;
   a battery;
   a micro control unit (MCU);
   a speed sensor to sense a speed of the automobile; and
   a first switch, a second switch, and an electronic switch comprising a first terminal, a second terminal, and a control terminal;
   wherein the battery is connected to the power terminal of the first light group through the first switch, the power terminal of the first light group is connected to the first terminal of the electronic switch through the second switch, the second terminal of the electronic switch is connected to the power terminal of the second light group, the control terminal of the electronic switch is connected to the MCU, the MCU is connected to the speed sensor to receive a speed signal and compare the speed signal with a predetermined value; and
   wherein the MCU controls the electronic switch to be turned on in response to the speed signal being greater than the predetermined value, the MCU controls the electronic switch to be turned off in response to the speed signal being less than or equal to the predetermined value.

2. The automobile light control system of claim 1, further comprising a third switch connected to the MCU, wherein the MCU controls the electronic switch to be turned on in response to the third switch being turned on.

3. The automobile light control system of claim 1, wherein the predetermined value is 0 miles/hour.

4. The automobile light control system of claim 2, wherein the first light group comprises a plurality of daytime running lights, and the second light group comprises a plurality of low beam lights.

* * * * *